United States Patent [19]
Wallace et al.

[11] Patent Number: 5,175,617
[45] Date of Patent: Dec. 29, 1992

[54] TELEPHONE LINE PICTURE TRANSMISSION

[75] Inventors: Richard S. Wallace; Benjamin B. Bederson; Eric L. Schwartz, all of New York, N.Y.

[73] Assignee: Vision Applications, Inc., Allston, Mass.

[21] Appl. No.: 802,328

[22] Filed: Dec. 4, 1991

[51] Int. Cl.⁵ .............................................. H04N 7/12
[52] U.S. Cl. ................................... 358/133; 358/138; 370/69.1
[58] Field of Search ................. 358/133, 138, 85, 469; 370/69.1; 178/49, 47

[56] References Cited

U.S. PATENT DOCUMENTS

| | | | |
|---|---|---|---|
| 420,884 | 2/1990 | Mercadier | 178/47 |
| 2,198,248 | 4/1940 | Hansell | 358/469 |
| 2,220,689 | 11/1940 | Shore | 358/133 |

Primary Examiner—Howard W. Britton
Attorney, Agent, or Firm—Eliot S. Gerber

[57] ABSTRACT

A system and method is provided to transmit logmap video images through telephone line band-limited analog channels. The pixel organization in the logmap image is designed to match the sensor geometry of the human eye with a greater concentration of pixels at the center. The transmitter divides the frequency band into channels, and assigns one or two pixels to each channel, for example a 3KHz voice quality telephone line is divided into 768 channels spaced about 3.9Hz apart. Each channel consists of two carrier waves in quadrature, so each channel can carry two pixels. Some channels are reserved for special calibration signals enabling the receiver to detect both the phase and magnitude of the received signal. If the sensor and pixels are connected directly to a bank of oscillators and the receiver can continuously receive each channel, then the receiver need not be synchronized with the transmitter. An FFT algorithm implements a fast discrete approximation to the continuous case in which the receiver synchronizes to the first frame and then acquires subsequent frames every frame period. The frame period is relatively low compared with the sampling period so the receiver is unlikely to lose frame synchrony once the first frame is detected. An experimental video telephone transmitted 4 frames per second, applied quadrature coding to 1440 pixel logmap images and obtained an effective data transfer rate in excess of 40,000 bits per second.

34 Claims, 4 Drawing Sheets

TRANSMITTED SIGNAL SPECTRUM: REAL

TRANMITTED SIGNAL SPECTRUM : REAL

TRANSMITTED AUDIO SIGNAL, s(t).

TELEPHONE LINE PICTURE TRANSMISSION

This invention was made with Government support under contract number DARPA N 00014-90-C-0049 awarded by The Department of Defense. The Government has certain rights in this invention.

BACKGROUND OF THE INVENTION

1. Field of the Invention

The present invention relates to the transmission of pictures over conventional narrow frequency band telephone lines.

2. Related Art

It has long been a goal to transmit pictures along with voice from one person to another. The ability to see the other person while conversing would be a great advance in business and personal communications.

However, the conventional telephone line has a narrow bandwidth of less than 4 thousand Hertz. The present invention uses only the 3000 Hz band from 500 Hz to 3500 Hz. Consequently, it has not been possible to transmit real-time moving TV pictures over the telephone line.

A number of devices, articles and patents have suggested various approaches to the transmission of pictures. One approach is to "slow-scan" an image field and, in effect, transmit still pictures. These devices are sometimes called "video telephones"; but they have not met widespread consumer acceptance, possibly because people are familiar with TV images and movies and expect images to have movement.

Slow scan video systems transmit video images over analog voice-grade telephone lines. This fax-like technology sends a series of still video frames, and generally each picture is transmitted like a TV image in raster format. The exact frame size and frame rate vary with the system, but one inexpensive slow-scan system sends one frame every 9 to 12 seconds. A frame consists of 200×242 pixels, each having 6 bits of resolution, so that each picture contains about 350000 bits.

The data rate is 32000 bits/sec. and uses pulse-width modulation to transmit about 4800 pixels/second.

Another approach to the transmission of visual images is to use broad band transmission lines instead of conventional telephone lines. That approach requires a special broad band transmission line from one receiver to another. That type of equipment, because of its expense has also found limited consumer acceptance and is presently used mainly for business teleconferences. An early attempt to introduce wide-band real-time image transmission was the "Picturephone" (TM A.T & T). The Picturephone standard was based on a 1 megahertz bandwidth channel for each signal (2 such channels are needed to transmit and receive). Picturephone images were rectangular, having 250×211 pixels (52,750 pixels per image), and were displayed at 30 frames per second. The most optimistic projections about the expected future lower costs of band-width predicted that Picturephone service would cost 10 times that of the voice telephone, but based on the ratio of bandwidths alone, it is 300 to 400 times the cost.

The video telephone is now used mainly for corporate video teleconferencing.

Advances in digital image compression standardization have led to the development of video telephone systems compatible with ISDNs (Integrated Services Digital Networks). ISDN may not be fully implemented in the United States or in other countries for another 10 or 20 years.

But some companies are developing ISDN picture telephone systems. One example is the AEG Olympia "Mike". This system consists of a video monitor and camera, a motion estimating video codec, and an ISDN telephone. The images are in color, the sound is synchronized, and the images are based on a nominal TV image format using 1.5M bytes/sec. Compaction is acheived by parallel execution of a discrete cosine transform and motion estimation algorithm on image sub-blocks. The codec consists of a total of 12 ADSP-2101 processors.

The CCITT H.261 proposed standard, sometimes called p×64, defines a method for visual telephone communication. The expression p×64 denotes the fact that the channel data rate is an integer $1 \leq p \leq 32$ times 64K bits per second. The special case of $p=1$ is the defacto standard for a low-end video phone using a 64K bit per second ISDN line. The case $p=32$ is a high-end standard for video teleconferencing.

JPEG (Joint Photographic Experts Group) is a committee of CCITT/ISO. Another committee is MPEG (Motion Picture Experts Group). JPEG is defining 3 levels of the JPEG standard. JPEG is a combination of the discrete cosine transform and run-length coding.

Standardization efforts such as JPEG have nearly matured into detailed specifications for video telephone systems. However, they are not ideal for the transmission of a "log map" image. The logmap image matches the geometry of the human eye. Near the center of the image, the pixels are small, but they increase in size with distance from the center. The image, like the human eye, has a high resolution central area and diminishing resolution toward the periphery. In the human eye the decreasing resolution (and increasing pixel size) away from the center is known to follow a log function, hence the term "log map image". Other terms for this type of image include "foveated", "retinal" or "log polar". The log map image has the same maximum resolution and field-of-view as a conventional TV image, but it contains far fewer pixels. For example in our telephone transmission system the logmap contains about 1400 pixels, compared with about 250,000 pixels in a conventional TV image. Hence, a logmap image is not a "normal" TV image because it is not a rectangular array of pixels. The JPEG standard essentially assumes that the image contains large, homogeneous regions, but the logmaps are small and high-variance. Also, transmission of JPEG images requires an extremely low noise digital channel, but voice-quality telephone lines are not low noise.

We attempted to apply publicly available JPEG image compression software to our logmap images. The JPEG algorithm is not suited to our logmap images, however, because the JPEG algorithm is defined for TV images. TV images are large rectangular arrays of rectangular pixels, and the JPEG algorithm divides these arrays in 8/times 8 blocks for compression. The bow-tie shape of the logmap image (see FIG. 1A) makes it unsuitable for this type of subdivision. The JPEG compression algorithm is one example of a family of compression algorithms that all work by subdividing the image in square blocks. These algorithms assume that the image is large, rectangular, and that many of the blocks are either low-variance or contain highly correlated data. None of these assumptions is valid for logmaps, which tend to be small, non-rectangular, and high-variance.

The high-technology modems presently commercially available can transmit error-free digital information at up to about 18000 bits per second, although error-correcting codes sent along with the data may reduce the transmission rate to around 14500 bits per second. One of the key features of a modem is the very high probability that the data will be received error free.

The Telebit modem is an example of a high speed digital modem. It uses an extension of QAM (quadrature amplitude modulation) to a multicarrier modulation method called DAMQAM, (dynamic adaptive multicarrier QAM). DAMQAM divides the voice band into 511 channels, each of which transmits two to six bits about every 1/10 second. The "dynamic adaptive" part of DAMQAM is the modem's method of selecting which subset of the 511 channels to use and how many bits to assign to each, which is based on measured error characteristics of each channel. The "Telebit" claims a maximum data rate of 18031 bits per second on a local telephone connection, which is reduced to 14400 bits per second by the overhead of an error-checking protocol. The bit rate is reduced further as the noise in the phone connection increases.

The key point here is that in the present invention the frame rate is always constant, but if a digital modem were used then the frame rate would depend on the signal-to-noise ratio (SNR). The higher the SNR over a given bandwidth, the more bits (and hence pixels) per second that can be transmitted through a digital modem. The present system attempts to send a constant frame rate. The penalty that is paid is that some pixels may be noisy, i.e. a pixel's gray level at the receiver does not necessarily match its gray level at the transmitter. But because the signal is an image, the person at the receiver can tolerate a small amount of noise (variation of gray levels) and the image is still recognizable. In other words, as to the amount of acceptable noise the requirements of image transmission are not as strict as digital data transmission.

SUMMARY OF THE INVENTION

In accordance with the invention there is provided a modem system and method for the transmission of images over narrow-band voice quality telephone lines. The transmission of the images is at a sufficiently high rate of speed, for example 4 full frames per second, that the image appears to the viewer to be a realtime continuous image similar to the image he would see on TV or in the movies.

The videophone (image transmission over telephone lines) of the present invention divides the voice band from 500Hz to 3500Hz into 768 carrier frequencies (channels) each of about 3.9Hz. Each channel can modulate two independent signals (quadrature coding), resulting in 768×2=1536 separate signals. Each quadrature signal is amplitude modulated by a separate pixel brightness value. Some number of the channels, however, are reserved for special calibration signals. These calibration signals allow the receiver to compensate for the phase and amplitude distortions on the phone line. If 48 calibration channels are used, as in our prototype, the number of available signals is reduced to 2×(768−48)=1440. Unlike the modem, there is no requirement that the signal be noiseless and there is no error-correcting code. The transmission is analog, not digital code. Because we are communicating pictures between people, we can take advantage of the human eye's ability to correct and interpret the signal. The analog signal does not contain the synchronization pulses (line and frame) found in time-domain video and does not contain an address for each analog signal. This is a considerable savings in transmission compared to the digital transmission, for each pixel, of a byte of information and its address (often another byte). In the ideal extreme case, our video phone signal is completely asynchronous: the brightness of a single pixel continuously modulates a single carrier.

The system and method has the following features: (1) The transmitted images are logmaps (i.e. images, for example, from a space-variant sensor approximating the sensor geometry of the human eye). (2) The transmission method is analog, like composite video, but unlike conventional TV, the signal contains no horizontal or vertical blanking signals. Instead, each pixel brightness modulates a unique carrier assigned to that pixel. Thus, the spatial frequencies of the image are coded directly as a time-domain signal. The d.c. component of the image becomes a large spike in the time-domain signal, providing the receiver a means to synchronize to frames. (3) The duality of the image frequency domain and the signal time domain enable the control of the tradeoff of frame rate and resolution.

BRIEF DESCRIPTION OF THE DRAWINGS

Other objectives of the present invention will be apparent from the following detailed description taken in conjunction with the accompanying drawings. In the drawings.

Each pixel is represented by a circle whose size is proportional to the size of the corresponding pixel.

Figure 3A:
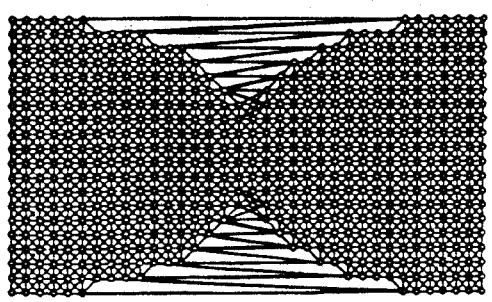
FIGS. 3A and 3B show the neighbor relations of the forward (FIG. 3A) and inverse (FIG. 3B) logmaps.
Figure 4:
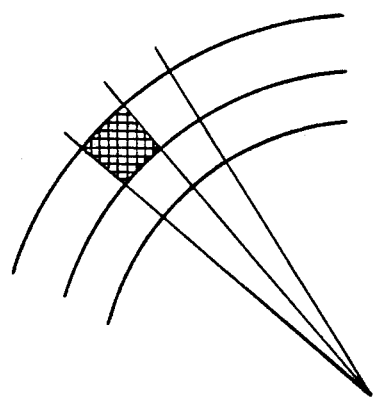
Figure 5:
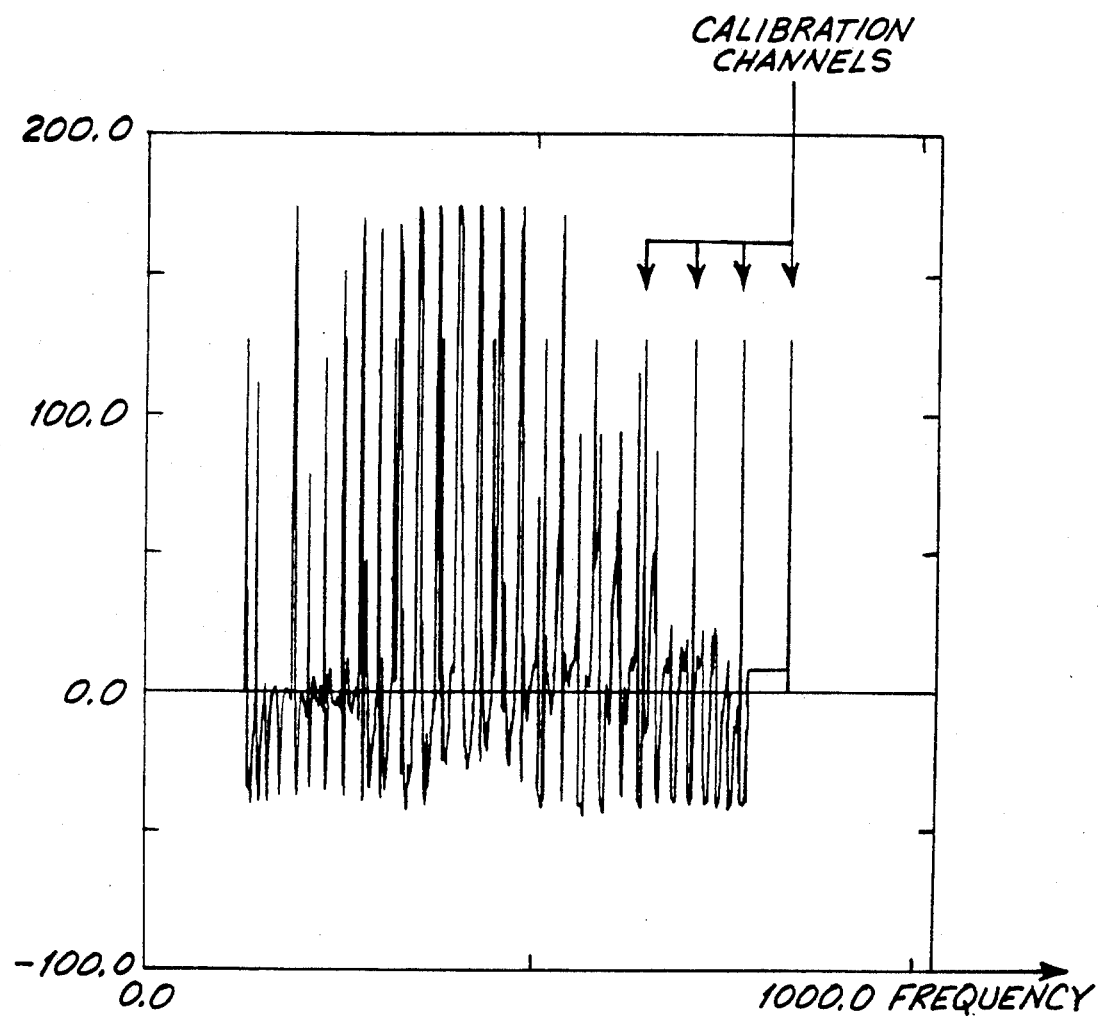

A line is drawn between every pixel and its neighbors;

FIG. 4 is an enlarged view of a pixel of FIG. 3A;

FIG. 5 is an example of a real transmitted signal spectrum; and

Figure 6:
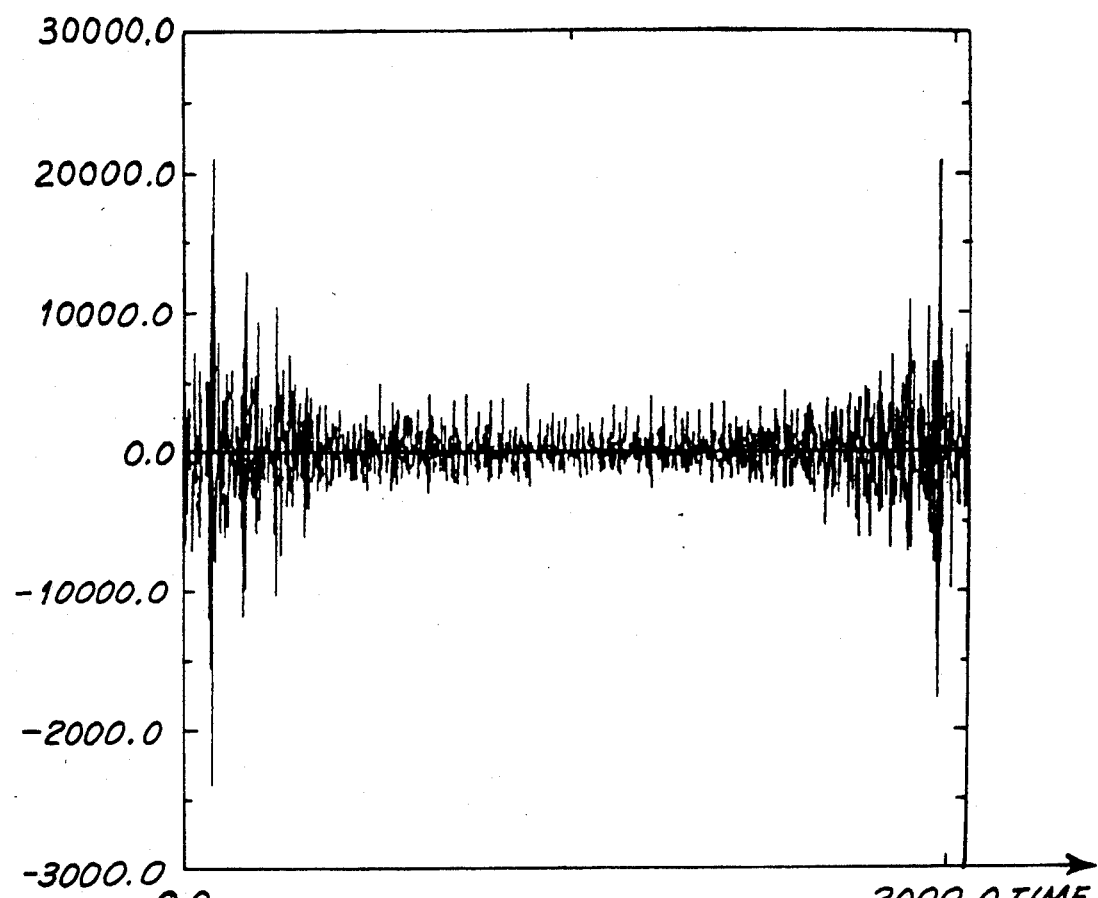

FIG. 6 is an example of the transmitted audio signal $s(t)$.

DETAILED DESCRIPTION OF THE INVENTION

It is desired to display a logmap on a TV screen, or compute one from a TV image. The logmap is defined as a mapping from a rectangular TV image $I(i,j)$ where $i=\{0, 1, \ldots, m-1\}$ and $j=\{0,1, \ldots, n-1\}$. A pixel is a 2 dimensional picture element, and $I(i,j)$ refers to a pixel coordinate in a TV image, where i is the row number and j is the column number. $I(i,j)$ has m rows and n columns.

Figure 1A:
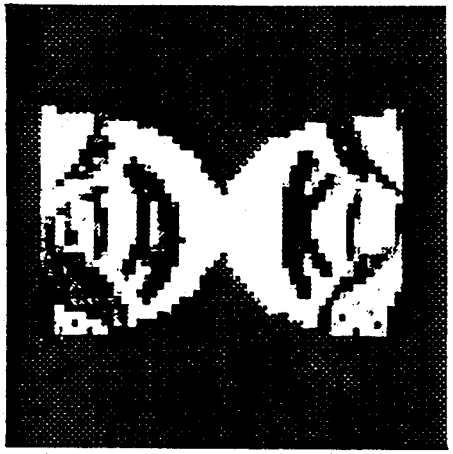
FIG. 1A is an example of a space-variant image $L(u,v)$ of the word "TAXI"
Figure 2A:
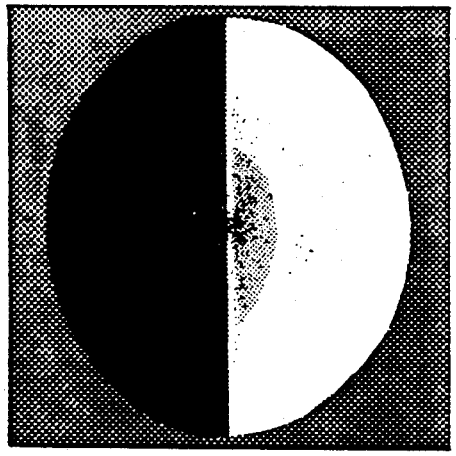
FIGS. 2A and 2B are images of the look up tables $r(i,j)$ and $s(i,j)$ defining the space-variant images of FIGS. 1A and 1B, respectively.
Figure 2B:
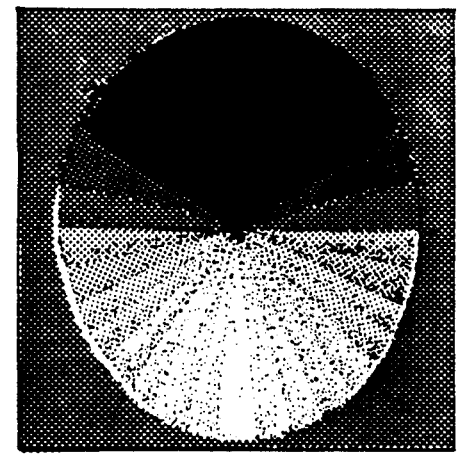

Let $L(u,v)$ be the forward logmap, with $u=\{0, 1, \ldots, p-1\}$ and $v=\{0, 1, \ldots, q-1\}$. $L(u,v)$ is the "bow tie" image shown in FIG. 1A. In $L(u,v)$, u is the row number and v is the column number. $L(u,v)$ contains p rows and q columns. Not all of the forward logmap shown in FIG. 1A is valid data that needs to be transmitted. Black pixels surround the logmap image. The black regions that surround the "bow tie" image should not be transmitted. Therefore, only certain values of u and v, the ones inside the "bow tie" region, are valid. The mapping from the TV image to the forward logmap image is accomplished by two lookup tables, r(i,j) and s(i,j), where i and j are the same as for I(i,j). In r(i,j), r stands for rings, and in s(i,j), s stands for spokes. The ring and spoke patterns, shown in FIG. 2, are superimposed on the TV image. Now, any given TV image pixel is contained within a given spoke and ring pair as shown in FIG. 4. The lookup tables, r(i,j) and s(i,j), map groups of TV image pixels to a single logmap pixel, defined by a spoke and a radian. A logmap image contains less pixels than a TV image. Generally, the rectangular TV image has many more pixels than the forward logmap. For example the ratio of TV pixels to logmap pixels may be 30:1 or higher. At the center of the logmap image, pixel size is the same as a TV image pixel and the mapping is one-to-one. Further from the center, however, logmap pixels are larger and represent a group of TV pixels, which are of unit area. The different TV pixel intensities are "blended" together to create one intensity for the logmap pixel.

Let $a(u,v)$ be the area (in TV pixels) of a logmap pixel $(u,v)$.
Then, $$a(u,v) = \sum_{i,j} 1 \mid r(i,j) = u \text{ and } s(i,j) = v \qquad (1)$$

Equation (1) counts up the individual TV pixels in a given spoke-ring pair and assigns them to a rectangular (u,v) coordinate in the forward logmap.

The logmap is defined as $$L(u,v) = \frac{1}{c(u,v)} \sum_{i,j} I(i,j) \mid r(i,j) = u \text{ and } s(i,j) = v \qquad (2)$$

$L(u,v)$ maps a given spoke-ring pair to a single row, u, and column, v, in the foward logmap. $L(u,v)$ exists in the computer memory of the transmitter as a set of numerical values corresponding to logmap pixel intensity.

Note that in (2) above, the pixel intensities, I(i,j), of a specified group of TV pixels, in a spoke-ring pair, are summed together and divided by the area, a(u,v), of the logmap pixel to calculate the intensity of the logmap pixel. In this way a group of rectangular TV image pixels are "blended" or averaged into one logmap pixel.

The inverse logmap is defined as $$L^{-1}(i,j) = L(r(i,j), s(i,j)) \qquad (3)$$

Figure 1B:
FIG. 1B is an example of the inverse image $L^{-1}(i,j)$ of the example of FIG. 1A.

The pixel pattern of an inverse logmap is designed to approximate the spatial pattern of photodetectors in the human eye (see FIG. 1B). FIG. 1A is an example of a forward logmap, L(u,v), and FIG. 1B is its inverse, $L^{-1}(i,j)$. The smallest pixel, in the center of the inverse logmap image, has the same area as a TV pixel, namely about $(10 \text{ um})^2$ for a CCD sensor. The image field-of-view is also identical to the TV image. Thus, the logmap image has the same field width and the same maximum resolution as the original TV image, but far fewer pixels.

Figure 3B:
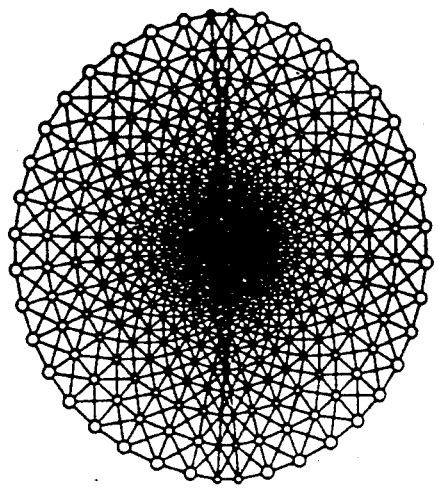

In one prototype the hardware consisted of a pair of telephone interfaces (TIFs), a transmitter T and a receiver R, see FIG. 3. Both T and R were built from Cermatek CH1811 Telephone Line Interfaces, electronic modules approved by the FCC for direct connection to the voice-band telephone network in the United States. The TIFs also contained an on-hook switch, a ring indicator LED, and connectors for audio input and output lines. The T unit also contained a signal amplifier and the R unit contained a volume control for the output.

The TIFs were connected to digital computer workstations (Sun TM "Sparcstations") through the computer's audio port. The Sparcstation audio ports consisted of 8-bit D/A and A/D converters running at 8000 samples per second, plus buffer memory. The analog input signal to the audio port was converted from (to) an 8-bit digital u-law representation.

The Sun computers execute all the audio coding and decoding functions in software. The transmitting Sun computer is also connected to a frame grabber capable of digitizing live video images. The transmitting computer performs an inverse Fourier transform on a range of carrier wave frequencies, where there are two carriers in quadrature coding at each frequency (See FIG. 5), to create one analog signal, s(t), that is transmitted through the audio part to the receiving computer (See FIG. 6). The receiving computer then performs a forward Fourier transform on the captured signal, s(t), and derives the original amplitudes of the quadrature coded carriers at each frequency. Each carrier amplitude is assigned to an individual pixel on the receiving station video screen according to its frequency and phase (sine or cosine), thereby recreating the original transmitted video image.

Signal Processing

The goal is to transform the logmap image $L_T(u,v)$ into a real time-domain signal s(t) that can be transmitted from T to R such that a computer at R can reconstruct a logmap image $L_R(u,v)$ that looks like $L_T$. Among the possible metrics we might choose for measuring the similarity of $L_T$ and $L_R$, we selected the sum-of-squared-error criterion:

$$\theta(T,R) = \sum_{u,v} (L_T(u,v) - L_R(u,v))^2 \qquad (4)$$

There are also many choices for s(t). One choice would be something like the standard TV format, but because the transmission channel is band-limited, we would have to transmit s(t) very slowly, like a slow-scan video. We also know from TV experience that a video signal containing synchronization pulses does not make good use of the 5 MHz available frequency range. A modem signal such as DAMQAM would minimize e(T,R). Sophisticated modem signals, unlike TV signals, do achieve full utilization of the available frequency band. But the speed of even the fastest modem is not fast enough for useful video, mainly because a modem signal can tolerate little noise. Digital image compression may reduce the bit rate, but the standard compression algorithms like JPEG and the Hotelling transform do not commute with the logmap transform. A logmap contains perhaps 1500 pixels, compared with a TV picture having about 250,000 pixels. This represents a reduction of about 166 times. Image compression algorithms such as JPEG are often claimed to reduce the amount of image data by a factor of 8. If these reduction factors were to commute, then we could expect to reduce the logmap to about the equivalent of 187 pixels' worth of information. But these compression algorithms do not work well on logmap images, so the reduction factors do not in fact commute. Some compression algorithms achieve spectacular results on TV rasters, but the logmap signal is frequently high-variance and uncorrelated, and it has only a small number of pixels compared with TV.

TRANSMITTER

Mapping pixels to frequencies

The computer stores the logmap image $L(u,v)$ in $p \times q$ consecutive memory locations. If the first pixel is stored at address 0, then the pixel value $L(u,v)$ is stored at address $uq+v$. Not all of the pq memory locations contain valid pixels. Locations inside the array $L(u,v)$ that do not contain valid pixels are called "void pixels" and are graphically represented as the black area surrounding the logmap in figure IA. The nonvoid logmap pixels form the "bow-tie" pattern illustrated in FIG. 1A.

Referring to the definition of the logmap given by equations (1) and (2), we can count the number of nonvoid pixels with $$l = \sum_{u,v} 1 | a(u,v) > 0. \tag{5}$$

We want to use these $l$ pixel values to modulate $l$ unique carrier waves within the telephone band. At any particular frequency, there are two carrier waves in quadrature. We refer to these two carriers as the sine and cosine (or, the complex and real) carriers. A carrier frequency is also called a channel.

Let the sampling rate be $f_S$ and the image frame rate be $f_T$. If we fix $f_T$ so that $n = f_S/f_T$ is an even integer, then the carrier frequencies can be indexed by $z = 0 \ldots n-1$. A frequency $z$ is modulated by a complex constant $S(z)$.

Not all the n frequencies are valid, because the telephone channel is band limited and the signal must be real. A time-domain signal is guaranteed to be real if its frequency spectrum is Hermetian. If we let the channels numbered 0 through $n/2-1$ correspond to the positive frequencies and those from $n/2$ to $n-1$ be negative frequencies, the Hermetian condition is met when $$RE(S(z)) = RE(S(n-z-1)), z < n/2 \tag{6}$$

and $$IM(S(z)) = -IM(S(n-z-1)), z < n/2. \tag{7}$$

Thus, no more than $n/2$ of the channels can be assigned independently.

The telephone bandwidth is limited so that only frequencies within a certain range can be transmitted over phone lines. The band limits $f_L$ and $f_U$ correspond to frequency indices $z_L$ and $z_U$ respectively. If f is a positive frequency in Hertz, then its frequency index $z = f/f_T$. Thus, the lowest numbered channel in the band is $z_L = [f_L/f_T]$ and the highest numbered one is $z_L = [f_L/f_T]$. The number of available independent channels, $n_B$, is therefore $n_B = z_U - z_L + 1$.

Each channel z can be modulated by one complex data $S(z)$, because each chanel consists of a sine carrier and cosine carrier. A system modulating both the sine and cosine carriers is said to be transmitting in quadrature. A complex number is a pair of real numbers, so the quadrature transmitter sends $2n_B$ real data per frame. The brightness of one pixel is measured by one real number, so we can transmit images having at most $1 < 2n_B$ pixels at $f_T$ frames per second.

In our prototype, $f_S = 8000$Hz and $f_T = 3.90626$Hz, resulting in $n = 2048$ channels. The telephone band is limited below by $f_L = 500$Hz and above by $f_U = 3500$Hz. These limits correspond to allow $n_B = 768$ independent channels separated by 3.90625 Hz. The channel separation equals the frame rate because $nf_T = f_S$.

We use a table M in computer memory to map pixels to frequencies. The table M is a one-to-one correspondence with the logmap array L so that, for the pixel value $L(u,v)$ stored at address $uq+v$ there is a corresponding entry of M stored at an address $uq+v$ locations after the beginning of M. This table M contains, for each pixel, a single binary digit $M_B$ indicating if the pixel is to modulate a sine carrier or a cosine carrier, and also a $\log_2(n)-1$ bit binary number, $M_A$, giving the index of the frequency. Thus we say that $z = M_A(u,v)$ gives the mapping from a pixel coordinate $(u,v)$ to a frequency index z, and $M_B(u,v)$ indicates whether the pixel is assigned to the sine or cosine carrier at z. If the pixel $(u,v)$ is a void pixel, the second number takes a special value higher than the highest available frequency index, i.e. $M_A(u,v) > z_U$. If the pixel is a valid logmap pixel (i.e. inside the "bow tie") then the corresponding entry of M is restricted so that $z_L \leq M_A(u,v) \leq z_U$ and $M(u,v) = M(w,x)$ if and only if $w = u$ and $x = v$.

A small number of the available channels are reserved to carry special calibration signals, the nature of which is described below. The mapping M is further restricted so that the logmap pixels are not mapped to these calibration channels. In other words, if $z_C$ is the index of a calibration channel, then $M_A(u,v) \neq z_C$.

In addition to its bandwidth limitations, the telepone channel also has a limited signal to noise ratio (SNR). Telephone company regulations prohibit the application of excessive voltage levels to the phone line. The SNR limitation effectively restricts the amplitude $|S(z)| < P$. Pixel values are generally represented as nonnegative integers 0 to $W-1$, for example numbers in the range 0 (black) to 255 (white). In order to utilize all the available SNR, we subtract $W/2$ from each pixel and scale the result. If the pixels $L(u,v)$ and $L(w,x)$ map respectively to the cosine and sine carriers of the same channel z, i.e. $M_A(u,v) = M_A(w,x)$ and $M_B(u,v) = 0$ and $M_B(w,x) = 1$, we set $$RE(S(z)) = \frac{\sqrt{2}}{2} P(L(u,v)/W - \tfrac{1}{2}) \text{ and} \tag{8}$$

$$IM(S(z)) = \frac{\sqrt{2}}{2} P(L(w,x)/W - \tfrac{1}{2}). \tag{9}$$

The steps involved in mapping pixels to frequencies can be summed up as follows. The transmitter uses the table M to assign each of the l logmap pixels to a either a sine or cosine carrier on some frequency. The number and spacing of the frequencies is determined by the channel bandwidth and the image frame rate. The number of available channels in turn fixes the number of pixels in the image. The pixel brightnesses modulate the carriers so that a white pixel will result in maximum positive amplitude and a black pixel will result in maximum negative amplitude.

Calibration Channels

A small number of the available channels, z, are reserved to carry special calibration signals. The function of these signals is to enable the receiver to determine the phase and attenuation of the received signal. The calibration channels are spaced through the telephone band, and picture information is carried on the channels between them.

The magnitude and phase $S(z)$ of a calibration channel, z, is constant. The transmitter assigns a fixed value to each of these channels. FIG. 5 is a plot of the entire real spectrum for one image. In this case the calibration channel values were all real and their magnitudes were all $P/4$. Other complex values could have been used instead.

The values modulating the calibration channels are fixed for a given transmitter and receiver pair, and these values do not change over time.

The channels carrying the image data, i.e. channels other than calibration channels, are called "image data channels" or "data channels".

The time-domain signal

After the image channels and calibration channels are assigned carrier data by the transmitter, the remaining out of band channels $0 \leq z_O < z_L$ and $z_U < z_O \leq n/2$ are set so that $S(z_O) = 0$. The negative frequencies are assigned according to equations (6) and (7) so that the spectrum is Hermetian.

The time domain signal, $s(t)$, is the inverse Discrete Fourier Transform (DFT) of the spectrum:

$$s(t) = \frac{1}{n} \sum_{z=0}^{z=n-1} S(z) \exp j2\pi zt/n \quad (10)$$

In our prototype the signal $s(t)$ is computed with the fast Fourier transform (FFT). The FFT algorithm reduces the number of additions and multiplications necessary to compute $s(t)$ from $S(z)$.

The signal $s(t)$ is stored in n computer memory locations. To convert the signal to an analog signal, the transmitter converts each of the n data to an analog voltage level using a digital-to-analog converter. One such converter is a standard voice telephone codec (coder-decoder), that converts $\mu$-law (an international standard to compress 16 bit data into 8 bits through a log scale) numbers into analog voltage levels and vice-versa. The samples are converted at the sampling rate $f_S$.

Because the signal $s(t)$ was synthesized in the frequency domain, it is properly band-limited and aliasing will not occur.

RECEIVER

Signal recovery

The frame rate is $f_T$. If only one initial frame is synchronized, all subsequent frames can be synchronized simply by digitizing the signal at $1/f_T$ second intervals. A locking loop may be used to synchronize subsequent frames, but it is not necessary as $1/f_T$ seconds is typically a long enough interval compared to the sample rate $f_S$ that the receiver is unlikely to get out of phase once a single frame is synchronized. There are many methods to synchronize to the first frame, one of which is to send an initial frame signal containing a single large spike. The receiver can detect this spike and align it with $t=0$. All subsequent frames are then digitized at $f_T$ second intervals.

The receiver captures the time domain signal by digitizing it at the sampling rate $f_S$. In our prototype an inexpensive telephone codec digitizes the signal into 8 bit $\mu$-law samples. These samples are converted to 16 bit quantities in computer memory. One frame of image data occupies n memory locations. The received signal is not exactly the same as the transmitted signal $s(t)$ because of noise, attenuation and phase distortion introduced by the telephone channel. Thus we refer to the received signal as $r(t)$.

The signal $r(t)$ is converted to the frequency domain signal $R(z)$ by the Fourier transform $$R(z) = \sum_{t=0}^{t=n-1} r(t) \exp - j2\pi zt/n. \quad (11)$$

Our prototype system computes the DFT using FFT algorithm.

Phase and attenuation recovery

For each calibration channel $z_C$ there is a predetermined calibration value $S(z_C)$. The receiver computes a complex constant $A(z_C)$ such that $A(z_C)R(z_C) = S(z_C)$. The constant $A(z_C)$ determines the phase and attenuation distortion introduced by the telephone channel.

All the image data channels fall between calibration channels, so the receiver computes a calibration value $A(z)$ for every channel z by the following procedure: If z is a calibration channel, then $A(z)$ is found by complex division $$A(z) = S(z)/R(z). \quad (12)$$

For all image data channels z falling between calibration channels, the calibration value $A(z)$ is found by linear interpolation between the next highest and next lowest calibration channels. Let $z_{CL}$ be the highest numbered calibration channel below Z and $Z_{CU}$ be the lowest numbered one above Z. Let $$p(z) = \frac{z - z_{CL}}{z_{CU} - z_{CL}}. \quad (13)$$

Then, $$A(z) = p(z)A(z_{CU}) + (1 - p(z))A(z_{CL}). \quad (14)$$

Thus each channel is assigned a calibration value. The linear interpolation of $A(z)$ may be improved somewhat if we interpolate its phase and magnitude rather than its real and imaginary parts.

After all channels have been assigned calibration values, we multiply the received signal $R(z)$ by its associated calibration value to obtain $R_s(z) = A(z)R(z)$. The signal $R_s(z)$ is now a close approximation to $S(z)$, up to noise introduced by the channel and inaccuracy in recovery of the calibration channels.

Mapping frequencies to pixels

The receiver uses the table M to recover the logmap image from the signal $R_s(z)$. For any pixel $L(u, v)$ the receiver can locate the channel and carrier from the table M, and set the pixel value accordingly. The pixel value recovered from $Rs(z)$ is in the range $-W/2$ to $W/2 - 1$, so the receiver adds $W/2$ to each pixel value.

In addition, the receiver may optionally apply some automatic gain control function or other image noise removal procedure to increase the quality of the received image.

Fourier Series Representations of Time Functions

A time varying voltage signal, f(t), similar to s(t) above, can be approximately represented over a finite time interval, T, from $t_1$ to $t_1+T$ by a sumation of individual sinusoidal and cosinuosoidal voltage waveforms that are an expansion of the basis functions $\phi_2(t)=3^{jset}$ where $\omega_2=2\pi/T$ and $n=0, \pm1, \pm2, \ldots$ The expansion is $$f(t) = \sum_{n=-\infty}^{\infty} a_n e^{jn\omega_0 t} \quad t_1 < t \leq t_1 + T \text{ where} \tag{15}$$

$$a_n = \frac{1}{T} \int_{t_1}^{t_1+T} f(t) \epsilon^{-jn\omega_0 t} \tag{16}$$

and is referred to as a Fourier Series. The coefficients of the sinusoidal and cosinusoidal waveforms are $a_2$, and are given by (16) above. As n grows larger, more sinusoids and cosinusoids are added to the approximation, and the coefficient of each one becomes progressively smaller according to (16) above. The summation of progressively smaller sinusoids and cosinusoids thus causes the value of the summation on the right side of equation (15) to converge to the true value of f(t). At $n=\infty$, the summation represents f(t) exactly over the interval from $t_1$ to $t_1+T$. The convergence of the summation with the true waveform f(t) is assured if a set of conditions known as the Dirichlet conditions is met. The Dirichlet conditions are:

$$\int_{t_1}^{t_1+T} |f(t)| dt \text{ is finite} \tag{1}$$

2) There are no more than a finite number of maxima and minima in any finite period.
3) There are no more &than a finite number of discontinuities in any finite time period.

The signal, s(t), shown in FIG. 6, that is sent through the modem meets the Dirichlet conditions, so a convergent Fourier Series representation for s(t) exists over the interval $t_1$ to $t_1+T$.

Note that the Fourier Series representation is valid in the time period T, from $t_1$ to $t_1+T$. If, however, f(t) is periodic with a period of T, such as a square wave of period T seconds, then the Fourier Series representation is good for all time, t. The transmitted signal s(t) is not periodic and the Fourier Series is good only for each transmitted picture frame of time T.

The exponential term $e^{jset}$ in (15) can be replaced by using the relationship $e^{jest}=\cos(n\omega t)+j\sin(n\omega t)$. This means that f(t) in (15) may be rewritten as $$f(t) = \sum_{n=-m}^{\infty} a_n(\cos n\omega_0 t + j\sin n\omega_0 t) \tag{17}$$

For any real function, f(t), $a_6 a_e$. Since the signal s(t) is real, $a_{-s}=a_s'$ for this device. Also, since $\cos(-X)=\cos(X)$ and $\sin(-X)=-\sin(X)$, we can rewrite 11 as:

$$f(t) = a_0 + \sum_{n=1}^{\infty}(a_n + a_n^*)\cos n\omega_0 t + j(a_n - a_n^*)\sin n\omega_0 t \tag{18}$$

$$= \frac{a_0}{2} + \sum_{n=1}^{\infty} a_n \cos n\omega_0 t + b_n \sin n\omega_0 t$$

where $$a_n = \frac{2}{T} \int_{t_1}^{t_1+T} f(t)\cos n\omega_0 t \, dt \tag{19}$$

$$b_n = \frac{2}{T} \int_{t_1}^{t_1+T} f(t)\sin n\omega_0 t \, dt \tag{20}$$

The range of sinusoidal and cosinusoidal waveforms that make up a time varying signal f(t) can be represented as a frequency spectrum $F(\omega)$. A typical frequency spectrum of the signal s(t) that is sent through the audio part is shown in FIG. 5. Deriving a frequency spectrum $F(\omega)$ from a time varying signal f(t) is accomplished by the use of a mathematical algorithm called a Fourier Transform. Deriving a time varying function f(t) from a frequency spectrum $F(\omega)$ is accomplished by means of an inverse Fourier Transform.

Fourier Transforms

A general way of representing signals is known as the Fourier integral theorem, or the Fourier Transform. Let the time varying function f(t) be expanded over the time period T in the interval from $-T<t<T$ in an exponential Fourier Series having a period T. As the period T is increased, more and more of the time function will be included in the series representation. Since $=2\pi/T$, (15) and (16) may be rewritten as $$f(t) = \sum_{n=-m}^{\infty} a_n \epsilon\left(j\frac{2\pi nt}{T}\right) \text{ where} \tag{21}$$

$$a_n = \frac{1}{T} \int_{-\frac{T}{2}}^{\frac{T}{2}} f(t)\epsilon\left(-j\frac{2\pi nt}{T}\right) dt \tag{22}$$

As T goes to infinity, $\omega=2\pi/T$, the spacing between harmonic frequencies, becomes an infinitesimally small differential, $d\omega$. The angular frequency of any individual discrete component, given by $n_\omega$, becomes a continuous variable $\omega$. The summation of equation 15 now becomes the integral $$f(t) = \int_{-\infty}^{\infty} \epsilon^{j\omega t} \left[ \frac{d\omega}{2\pi} \int_{\infty}^{\infty} f(t) \epsilon^{-j\omega t} dt \right] \tag{23}$$

Rearranging gives $$f(t) = \frac{1}{2\pi} \int_{-\infty}^{\infty} \left[ \int_{-\infty}^{\infty} f(t)\epsilon^{-jwt} dt \right] \epsilon^{jwt} d\omega \tag{24}$$

This is a Fourier integral relation. When the inner integral is performed, time is integrated out, and the integral is then only a function of angular frequency, $\omega$. The inner integral is called the Fourier Transform of f(t) and is given by $$F\{f(t)\} = f(\omega) = \frac{1}{2\pi} \int_{-\infty}^{\infty} f(t)\epsilon^{-j\omega t} dt \quad (25)$$

The complete integral of (24) above may then be given as $$F^{-1}\{F(\omega)\} = f(t) = \frac{1}{2\pi} \int_{-\infty}^{\infty} F(\omega)\epsilon^{j\omega t} d\omega \quad (26)$$

This equation shows the relationship of $F(\omega)$ to $f(t)$ and is called the inverse Fourier Transform. Therefore, given a frequency spectrum for s(t), such as in FIG. 5, it is possible to create the original time varying signal s(t) as shown in FIG. 6 by using the inverse Fourier Transform in (26). The reverse procedure, going from $f(t)$ to $F(\omega)$, is possible using the Fourier Transform of (25) above. Discrete Fourier Transforms.

The Fourier Transforms in the preceding section were derived for the case where T was infinitely large, thus Producing an infinitesimally small frequency increment, $d_\omega$. The result was a continuous frequency spectrum, $F(\omega)$, filled with an infinite number of frequency components. Similarly, f(t) was a continuous function. The signal transmitted through the modem, s(t), in this application differs significantly from this case. In the transmitting terminal, a finite number of pixels modulate the amplitude of a finite number of discrete frequency waveforms. At each frequency, there exists two waveforms; one sinusoidal and one cosinusoidal. The amplitudes of the finite number of waveforms are calculated and summed together to produce the signal s(t) which is transmitted to the receiving terminal. At the receiving terminal, s(t) is sampled at a high rate (Ex: 8000 samples per second). From these discrete samples of s(t), a spectrum of discrete frequencies is generated, where each frequency is mapped to a pixel on the receiver screen. The amplitude of the discrete frequencies generated by the receiver should correspond to the amplitudes of the original pixels in the transmitting terminal.

In this application, special forms of the forward Fourier Transform and the inverse Fourier Transform are used for the discrete case. The equation for the forward Fourier Transform is given in (11) above. The equation for the inverse Fourier Transform is given in (10) above.

Conclusion

This invention provides a system and method to send recognizable images over voice-grade telephone lines at a frame rate sufficient for real-time visual telecommunication. An experimental video telephone transmitted 4 frames per second by applying quadrature coding to logmap images having 1440 pixels to obtain an effective data transfer rate of 46080 bits per second. (4 frames/second × 1440 pixels/frame × 8 bits/pixel = 46080).

Some slow-scan systems purport to send 35000 bits/sec, and our system sends over 40000 bits/sec. How can one exceed the theoretical maximum? This contradiction is resolved by the fact that both the slow scan video phone and our video phone use analog channel coding, and the bits per second figure refers only to the information content of the transmitted image. The video phone system is designed to tolerate a certain degradation of picture quality characterized by the difference between the theoretical optimum and our higher figure. Therefore, one would expect the received image to contain less information than the transmitted one. In many instances the phone line will have better than average signal to noise performance, and in those cases we can receive error-free 40000 bits per second.

This system and method has advantages over digital modems. Modem designers have achieved high bit rates by dividing the voice band into many independent channels, and estimating the attenuation and signal-to-noise ratio on each channel. But the noise estimation and adaptive equalizaton techniques have two drawbacks for video. First, the frame rate depends on the signal to noise ratio. Second, the complexity of the digital coding and decoding, including image compression adds a cost in both circuitry and in departure from the theoretical optimum data rate over the given channel. In general a modem transmitter consists of an encoder and a modulator. The encoder adds redundant information to the input bit stream, for the purpose of error detection and correction. The receiver consists of a demodulator and decoder. The receiver decoder uses the redundant bits to detect transmission errors. But the addition of these redundant bits results in a departure from the theoretical optimum channel capacity.

The present invention adds no redundant information to the input image data, so one key difference between a modem and this invention is that the video phone has no encoder or decoder in the sense of a modem. In this invention the frame rate is constant and independent of the signal to noise ratio. When the signal quality improves the picture quality also improves.

We claim:

1. A method for transmitting on communication channels an original logmap video image stored in the memory of a transmitting unit, and then reproducing a reproduced logmap video image from the memory of the receiving unit; the method including the steps of:

a) reducing a normal TV image composed of pixels to a logmap video image composed of fewer pixels by mapping selected groups of TV image pixels to a corresponding single logmap video pixel;

b) storing the luminance intensities of the logmap video pixels in digital computer memory of a transmitter wherein each said computer memory location is associated with the location of a particular logmap video pixel;

c) mapping the pixel intensities of the logmap video image stored in the memory of the transmitter to a series of at least 100 carrier waves of different frequencies within the bandwidth of the said communication channel, said mapping being performed in computer memory where the pixel intensity modulates the amplitude of a carrier wave at a given frequency;

d) summing together the individual waves, and calculating a time varying analog signal, s(t), which is the sum of said waves, said signal s(t) being stored as digital values in computer memory of the transmitter;

e) converting digital signal values of s(t) to analog signal values and outputting them to said communication channel;

f) sampling the analog signal on the communication channel at the receiving unit and storing the sampled values in computer memory of receiver as digital values;

g) deriving from the sampled values of s(t) stored in receiver memory, a spectrum of waves, where the amplitudes and frequencies of the derived waves correspond to the original waves summed by the transmitter;

h) recreating the logmap video image in computer memory of the receiver where the frequency of the waveform determines the location of each pixel and the amplitude of the waveform determines pixel intensity, and i) displaying the logmap video image stored in receiver memory on a TV screen.

2. A method as in claim 1 wherein the communication channel is a narrow bandwidth telephone line.

3. A method as in claim 1 wherein the step d) utilizes an Inverse Fast Fourier Transform (IFFT).

4. A method as in claim 1 wherein at least some of the carrier waves are sine wave.

5. A method as in claim 1 wherein at least some of the carrier waves are cosine wave.

6. A method as in claim 1 wherein the receiver uses an automatic gain control function to adjust the derived logmap video image stored i the receiver memory to the proper range of image intensity values.

7. A method as in claim 1 and including the step at the transmitter of inserting one large maximum into the analog signal s(t) to synchronize the receiver.

8. A method as in claim 7 wherein the receiver uses a locking loop to synchronize to the transmitted frames of s(t) and align the maximum with the start of each frame.

9. A method as in claim 1 and including the step of compacting said signal, s(t), in said transmitter memory using u-law coding to preserve precision during transmission.

10. A method as in claim 9 wherein the sampled values in receiver memory are compacted u-law digital values and including the step of converting the u-law values to binary code.

11. A method as in claim 9 wherein the compacted u-law digital values of s(t) are converted to analog levels using a codec that transmits the analog signal on the communication channel.

12. A method as in claim 11 wherein the receiver captures the transmitted signal, s(t), using a codec identical to the codec of the transmitter and sampling at the same rate as the sampling rate of the codec of the transmitter, wherein said receiver codec converts the analog values of s(t) to u-law coded digital memory values.

13. A method as in claim 1 wherein at least some of the carrier waves at selected wave frequencies are assigned as calibration channels that carry a reference signal.

14. A method as in claim 13 wherein the receiving unit derives the spectrum of sine waves and cosine waves from the sampled values of s(t) using a Forward Fast Fourier Transform.

15. A method as in claim 13 wherein at least 50 carrier waves are sine waves and at least 50 carrier waves are cosine waves.

16. A method as in claim 15 wherein the transmitting unit sums sasid sine waves, cosine waves and calibration waves into a single analog waveform, s(t), using an Inverse Fast Fourier Transform (IFFT).

17. A method as in claim 15 wherein the receiver uses the calibration signal frequencies to adjust the amplitudes of the pixel intensity sine and cosine waves by linear interpolation of the pixel frequencies lying between consecutive calibration frequencies.

18. A system for transmitting on communication channels an original logmap video image stored in the memory of a transmitting unit, and then reproducing a reproduced logmap video image from the memory of the receiving unit; the system comprising:

a) means for reducing a normal TV image composed to a logmap video image composed of fewer pixels by mapping selected groups of TV image pixels to a corresponding single logmap video pixel;

b) means for storing the luminance intensities of the logmap video pixels in digital computer memory of a transmitter wherein each said computer memory location is associated with the location of a particular logmap video pixel;

c) means for mapping the pixel intensities of the logmap video image stored in the memory of the transmitter to a series of at least 100 carrier waves of different frequencies within the bandwidth of the said communication channel, said mapping being performed in computer memory where the pixel intensity modulates the amplitude of a carrier wave at a given frequency;

d) means for summing together the individual waves, and calculating a time varying analog signal, s(t), which is the sum of said waves, said signal s(t) being stored as digital values in computer memory of the transmitter;

e) means for summing digital signal values of s(t) to analog signal values and outputting them to said communication channel;

f) means for sampling the analog signal on the communication channel at the receiving unit and storing the sampled values in computer memory of receiver as digital values;

g) means for deriving from the sampled values of s(t) stored in receiver memory, a spectrum of waves, where the amplitudes and frequencies of the derived waves correspond to the original waves summed by the transmitter;

h) means for recreating the logmap video image in computer memory of the receiver where the frequency of the waveform determines the location of each pixel and the amplitude of the waveform determines pixel intensity, and i) means for displaying the logmap video image stored in receiver memory on a TV screen.

19. A system as in claim 18 wherein the communication channel is a narrow bandwidth telephone line.

20. A system as in claim 18 wherein the step d) utilizes an Inverse Fast Fourier Transform (IFFT) program in computer memory.

21. A system as in claim 18 wherein at least some of the carrier waves are sine wave.

22. A system as in claim 18 wherein at least some of the carrier waves are cosine wave.

23. A system as in claim 18 wherein the receiver includes the means of an automatic gain control function to adjust the derived logmap video image stored in the receiver memory to the proper range of image intensity values.

24. A system as in claim 18 and including the means at the transmitter for inserting on large maximum into the analog signal s(t) to synchronize the receiver.

25. A system as in claim 24 wherein the receiver includes the means of a locking loop to synchronize to the transmitted frames of s(t) and align the maximum with the start of each frame.

26. A system as in claim 18 and including the means for compacting said signal, s(t), in said transmitter memory using u-law coding to preserve precision during transmission.

27. A system as in claim 26 wherein the sampled values in receiver memory are compacted u-law digital values and including the means for converting the u-law values to binary code.

28. A system as in claim 26 wherein the compacted u-law digital values of s(t) are converted to analog levels by means of a codec that transmits the analog signal on the communication channel.

29. A system as in claim 28 wherein the receiver includes the means to capture the transmitted signal, s(t), using a codec identical to the codec of the transmitter and sampling at the same rate as the sampling rate of the codec of the transmitter, wherein said receiver codec converts the analog values of s(t) to u-law coded digital memory values.

30. A system as in claim 18 wherein at least some of the carrier waves at selected wave frequencies are assigned as calibration channels that carry a reference signal.

31. A system as in claim 30 wherein the receiving unit includes the means to derive the spectrum of sine waves and cosine waves from the sampled values of s(t) using a Forward Fast Fourier Transform program in computer memory.

32. A system as in claim 30 wherein at least 50 carrier waves are sine waves and at least 50 carrier waves are cosine waves.

33. A system as in claim 32 wherein the transmitting unit includes the means for summing said sine waves, cosine waves and calibration waves into a single analog waveform, s(t), using an Inverse Fast Fourier Transform (IFFT) program in computer memory.

34. A system as in claim 32 wherein the receiver includes the means to use the calibration signal frequencies to adjust the amplitudes of the pixel intensity sine and cosine waves by linear interpolation of the pixel frequencies lying between consecutive calibration frequencies.

* * * * *